US012670730B1

(12) United States Patent
Wang et al.

(10) Patent No.: US 12,670,730 B1
(45) Date of Patent: Jun. 30, 2026

(54) MODELING IMAGES OBTAINED FROM VEHICLES USING PROMPTS

(71) Applicant: Samsara Inc., San Francisco, CA (US)

(72) Inventors: Yan Wang, Mercer Island, WA (US); William Evan Welbourne, Seattle, WA (US); William Nathan Hurst, Seattle, WA (US)

(73) Assignee: Samsara Inc., San Francisco, CA (US)

( * ) Notice: Subject to any disclaimer, the term of this patent is extended or adjusted under 35 U.S.C. 154(b) by 111 days.

(21) Appl. No.: 18/326,152

(22) Filed: May 31, 2023

(51) Int. Cl.
*G06V 20/59* (2022.01)
*G06V 10/25* (2022.01)
*G06V 10/74* (2022.01)
*G06V 20/70* (2022.01)

(52) U.S. Cl.
CPC .............. *G06V 20/59* (2022.01); *G06V 10/25* (2022.01); *G06V 10/761* (2022.01); *G06V 20/70* (2022.01); *G06V 2201/07* (2022.01)

(58) Field of Classification Search
CPC ........ G06V 20/59; G06V 10/25; G06V 20/70; G06V 10/761; G06V 2201/07
USPC ........................................................ 348/148
See application file for complete search history.

(56) References Cited

U.S. PATENT DOCUMENTS

| | | | |
|---|---|---|---|
| 2018/0229587 A1* | 8/2018 | Gao ................... | B60H 1/00978 |
| 2019/0286932 A1* | 9/2019 | Du .......................... | G06V 20/00 |
| 2020/0057487 A1* | 2/2020 | Sicconi ................... | G06F 3/011 |
| 2020/0211394 A1* | 7/2020 | King ................... | B60W 50/023 |
| 2021/0042662 A1* | 2/2021 | Pu .......................... | G06Q 50/01 |
| 2022/0108417 A1* | 4/2022 | Liu ......................... | G06F 40/30 |
| 2022/0129556 A1* | 4/2022 | Chen ...................... | G06F 21/74 |
| 2022/0203996 A1* | 6/2022 | Katz ..................... | B60W 50/14 |
| 2023/0082179 A1* | 3/2023 | Laradji .................. | G06N 3/045 |
| | | | 382/103 |
| 2023/0196600 A1* | 6/2023 | Portail ................. | G06V 10/761 |
| | | | 382/286 |

* cited by examiner

*Primary Examiner* — Thai Q Tran
*Assistant Examiner* — Nienru Yang
(74) *Attorney, Agent, or Firm* — Schwegman Lundberg & Woessner, P.A.

(57) ABSTRACT

Disclosed are systems, methods, and non-transitory computer-readable media for modeling images obtained from a vehicle using prompts. The system receives an image from a camera of a vehicle, the image depicting one or more objects. The system receives a prompt defining a target to be detected in the image. The system analyzes the image and data associated with the prompt using a machine learning model to generate a prediction indicating whether the one or more objects depicted in the image match the target defined by the prompt. The system causes a message to be displayed to an operator representing the prediction.

20 Claims, 9 Drawing Sheets

400

410 RECEIVE AN IMAGE FROM A CAMERA OF A VEHICLE, THE IMAGE DEPICTING ONE OR MORE OBJECTS

420 RECEIVE A PROMPT DEFINING TARGET TO BE DETECTED IN THE IMAGE

430 ANALYZE THE IMAGE AND DATA ASSOCIATED WITH THE PROMPT USING A MACHINE LEARNING MODEL TO GENERATE A PREDICTION INDICATING WHETHER THE ONE OR MORE OBJECTS DEPICTED IN THE IMAGE MATCH THE TARGET DEFINED BY THE PROMPT

440 CAUSE A MESSAGE TO BE DISPLAYED TO AN OPERATOR REPRESENTING THE PREDICTION

106

ROUTE MANAGEMENT SYSTEM

202

ROUTE CREATION COMPONENT

204

SENSOR DATA RECEIVING COMPONENT

206

VEHICLE ELD EVENT MANAGEMENT COMPONENT

208

ROUTE TRACKING REPORT GENERATION COMPONENT

210

OUTPUT COMPONENT

212

DATA STORAGE

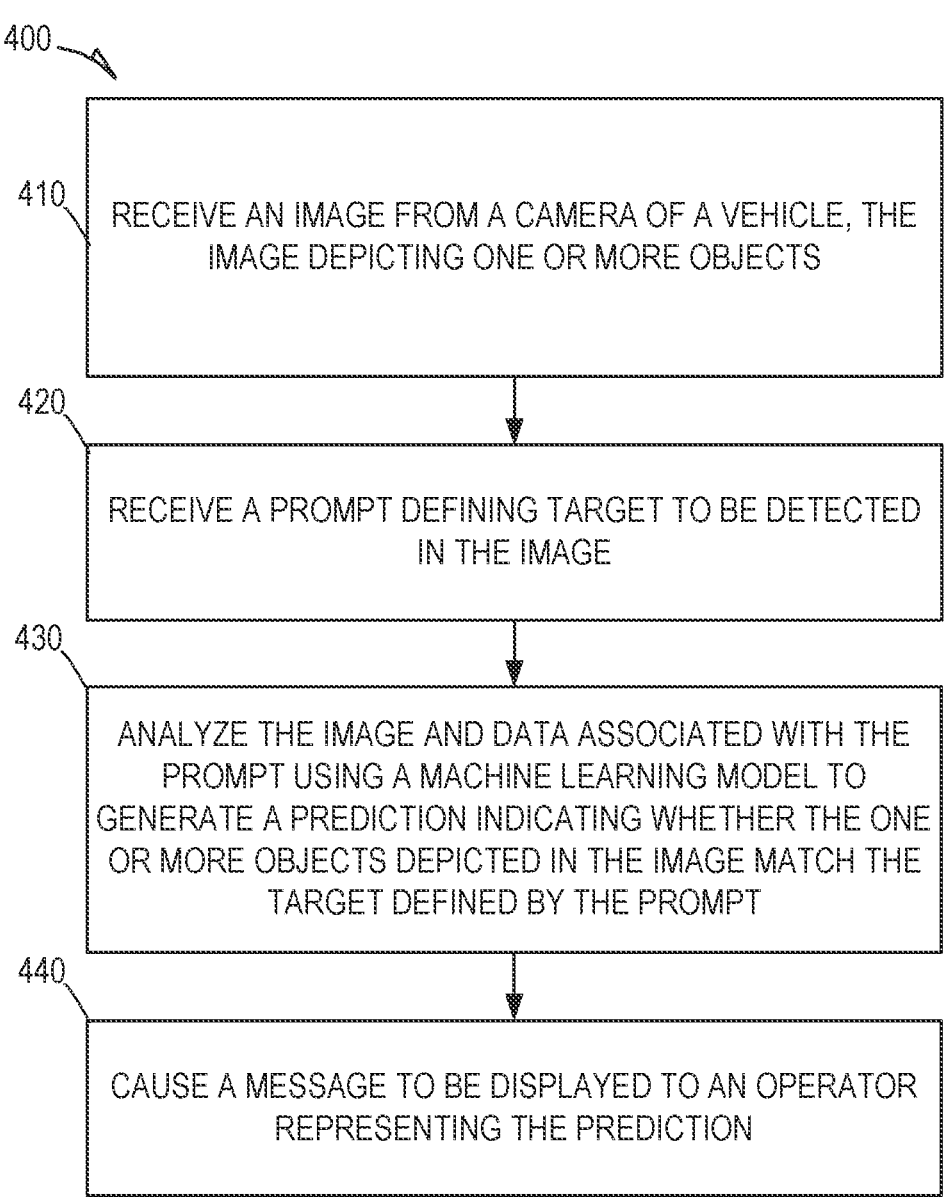

400

410  RECEIVE AN IMAGE FROM A CAMERA OF A VEHICLE, THE IMAGE DEPICTING ONE OR MORE OBJECTS

420  RECEIVE A PROMPT DEFINING TARGET TO BE DETECTED IN THE IMAGE

430  ANALYZE THE IMAGE AND DATA ASSOCIATED WITH THE PROMPT USING A MACHINE LEARNING MODEL TO GENERATE A PREDICTION INDICATING WHETHER THE ONE OR MORE OBJECTS DEPICTED IN THE IMAGE MATCH THE TARGET DEFINED BY THE PROMPT

440  CAUSE A MESSAGE TO BE DISPLAYED TO AN OPERATOR REPRESENTING THE PREDICTION

*FIG. 4*

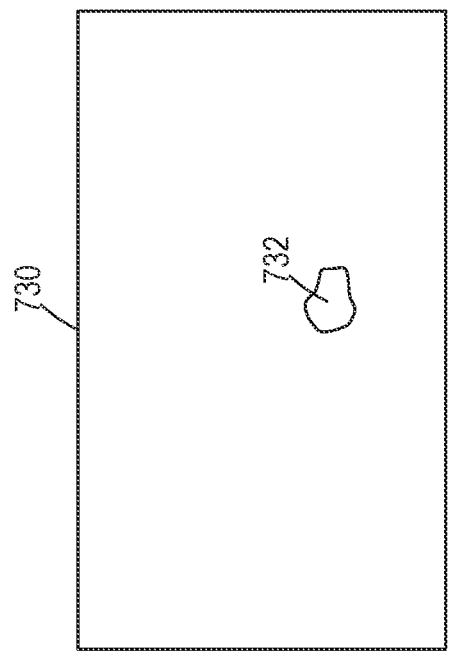
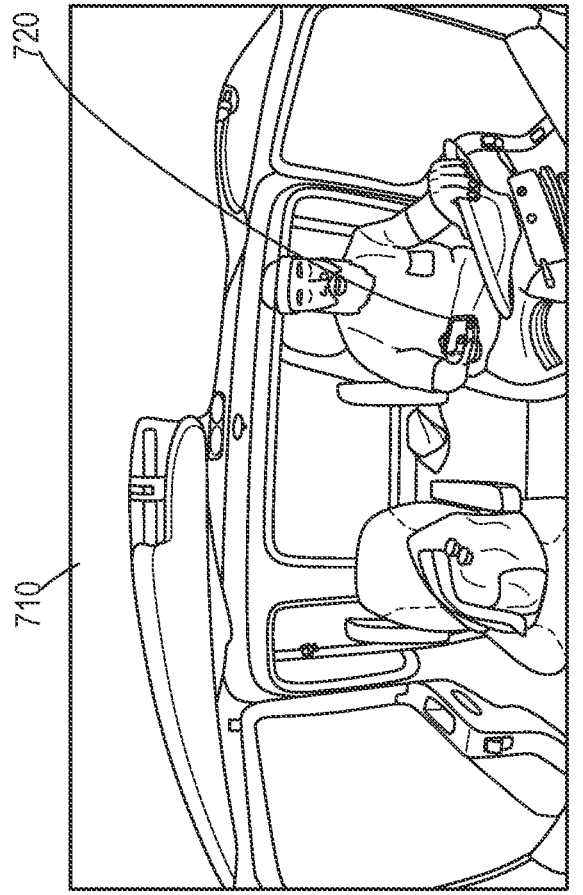
*FIG. 7*

MODELING IMAGES OBTAINED FROM VEHICLES USING PROMPTS

TECHNICAL FIELD

Examples of the present subject matter relate generally to vehicles and, more specifically, to modeling images obtained from vehicles.

BACKGROUND

Fleet managers track the movement of their vehicles to ensure that they are operating as expected. For example, fleet managers may track whether a vehicle began a route at an expected time, arrived at scheduled stops along the route, and completed the route. Fleet managers also may track whether drivers are operating the vehicle within regulations and safely. These processes are often performed manually; however, systems have been developed to automate this process.

BRIEF DESCRIPTION OF THE DRAWINGS

To easily identify the discussion of any particular element or act, the most significant digit or digits in a reference number refer to the figure number in which that element is first introduced.

FIG. 4 is a flowchart showing a process for modeling images obtained from vehicles, according to some examples.

FIG. 7 provides example training data for modeling images obtained from vehicles, according to some examples.

DETAILED DESCRIPTION

Figure 1:
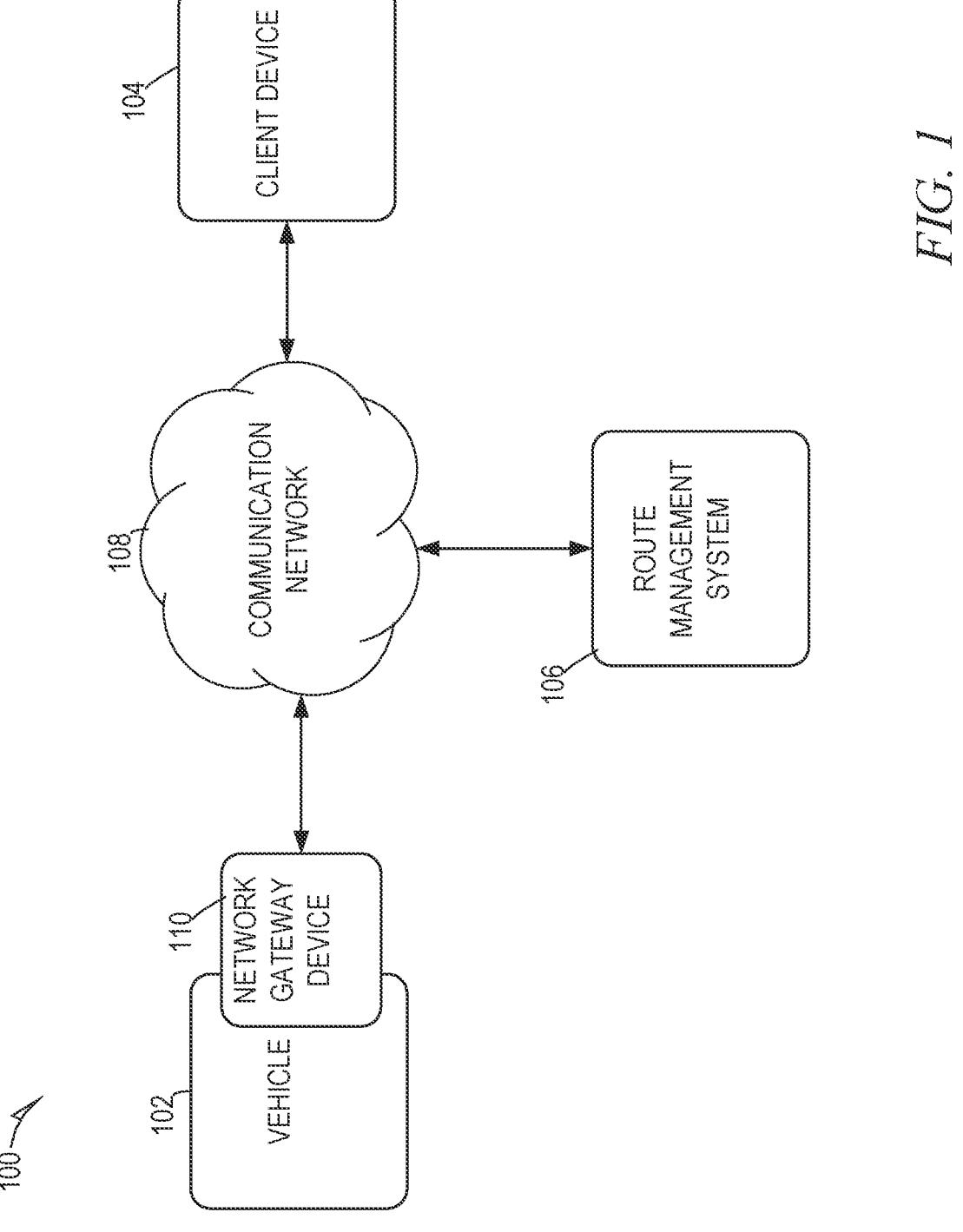
FIG. 1 shows a system for modeling images obtained from vehicles, according to some examples.

In the following description, for purposes of explanation, various details are set forth in order to provide a thorough understanding of some examples. It will be apparent, however, to one skilled in the art, that the present subject matter may be practiced without these specific details, or with slight alterations. Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment and the embodiments can be combined with each other.

For purposes of explanation, specific configurations and details are set forth in order to provide a thorough understanding of the present subject matter. However, it will be apparent to one of ordinary skill in the art that examples of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for modeling images obtained from a vehicle using prompts. The system receives an image from a camera of a vehicle, the image depicting one or more objects. The system receives a prompt defining a target to be detected in the image. The system analyzes the image and data associated with the prompt using a machine learning model to generate a prediction indicating whether the one or more objects depicted in the image match the target defined by the prompt. The system causes a message to be displayed to an operator representing the prediction.

Typically, vehicle management systems track behavior of drivers in the vehicles to ensure compliance with safety standards. The process of tracking such behavior is very difficult and time consuming. Also, the non-compliant behavior is usually detected after the fact. Specifically, vehicles are usually equipped with internal cameras (e.g., dashcams) which continuously record drivers and passengers in the vehicle. Backend operators can routinely review videos and images captured by these cameras, such as in response to certain events or requests. Manually reviewing the content captured by these cameras is incredibly time consuming and often results in missed events of non-compliance. This wastes a great deal of time and resources.

Certain systems can employ machine learning models to detect objects in images. These machine learning models can be used to determine whether certain objects are present in the images to improve the review process. However, these machine learning models are trained on a large dataset representative of various scenarios and populations and may not provide accurate results for specific instances that are being targeted. In order to train these systems to provide more specific instances of non-compliance, a large dataset of training images needs to be collected and then used to train the machine learning models. This process is also incredibly time consuming and inefficient to implement. Particularly, many types of vehicles can be configured for different types of scenarios and collecting the training data to capture each type of scenario is nearly impossible and impractical.

To alleviate these issues, the route management system provides for a system, including a machine learning model, that can receive a prompt identifying a target (e.g., input that defines non-compliant behavior or image content) in addition to an image from a vehicle. The machine learning model can then automatically, and in real time, process images captured by the vehicle together with the prompt to detect instances of non-compliance, such as if the target is detected in the image. In this way, by providing an additional point of direction to the machine learning model as a prompt, the machine learning model can efficiently and with very high accuracy detect instances of non-compliant behavior across a wide range of vehicle types and scenarios. This avoids having to re-train the machine learning models for each type of vehicle and scenario, which substantially reduces the amount of time and resources needed to accomplish the task.

Also, the machine learning models can provide real-time alerts or messages to vehicle operators and/or fleet managers when targets defined by the prompts are detected in images captured by the vehicle cameras (e.g., the dashcams), which allows the behavior to be identified and corrected right away rather than after the fact. This significantly improves the safety of operating the vehicles in a fleet.

The disclosed techniques can improve the operational efficiency of the route management system by reducing the amount of images and/or videos that need to be manually reviewed by operators, alleviating the operators' burden and enabling them to handle other tasks.

FIG. 1 shows a system 100 for modeling images obtained from vehicles, according to some examples. As shown, multiple devices (e.g., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, a wearable device, a watch, a dashcam, a video camera, and/or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device. In some cases, the communication can include an image or video captured by a camera on-board a vehicle. The camera can be forward facing away from a driver of the vehicle and/or rear-facing away from the driver and pointing towards the road.

The vehicle 102 may be any type of vehicle, such as an automobile, bicycle, motorcycle, skateboard, semi-trailer truck, plane, bus, train, ship, a vessel, and the like. As shown, the vehicle 102 includes a network gateway device 110 (e.g., vehicle gateway) that allows for remote communication between the vehicle 102 and one or more remote computing devices via the communication network 108. The vehicle can send images and/or videos captured by one or more on-board cameras to the client device 104 and/or the route management system 106 including an administrator or fleet manager device associated with an operator.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs)), actuators, etc. deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture images and/or video associated with a vehicle 102 and/or its surroundings. For example, the sensors may include engine speed sensors, fuel temperature sensors, voltage sensors, pressure sensors, radar sensors, location sensors, global positioning system (GPS) sensors that provide a current geographical location of the vehicle 102, light detection and ranking (LIDAR) sensors, imaging sensors (e.g., camera, video camera), and the like.

The route management system 106 is one or more computing devices that allow for generation and management of routes as well as automated route tracking and modeling images obtained from one or more vehicles 102. For example, the route management system 106 may allow administrators to generate routes and assign the generated routes to vehicles 102. The route management system 106 may also provide automated route tracking of the vehicles 102 based on the assigned routes. The route management system 106 may also enable operators, route managers, and drivers to access and view assigned past, present, and future routes. In some cases, the route management system 106 can process and/or analyze images obtained from the one or more vehicles 102 to model events and/or objects detected in the images. The route management system 106 can apply one or more machine learning models to the images to detect the presence of one or more targets defined by one or more prompts. The prompts can be specific to the type of vehicle and can be used to guide the machine learning models to identify the specific one or more targets with more accuracy and more efficiently. In some cases, the prompts are textual, images representing masks associated with the targets, and/or embeddings generated based on previously defined text and/or masks.

In some examples, the route management system 106 can detect that a target is present or exists in a given image received from the one or more vehicles 102. In such cases, the route management system 106 can trigger a message and present the message to an operator of the vehicle and/or an operator of the fleet. The message can identify the image and can visually identify the target detected in the image. In some examples, the route management system 106 can trigger and present a notification on a client device 104 of a driver or a display of the vehicle 102 alerting the driver about the event or target. For example, the target can correspond to holding a cell phone or drink in one hand while driving. In response to the route management system 106 detecting this target, the route management system 106 can trigger a message or notification for presentation to the driver informing the driver to stop performing the activity of holding the cell phone or drink.

The route management system 106 can also notify or transmit a communication (e.g., message) to an administrator or operator, such as fleet manager device that can be implemented by another client device 104. In this way, the fleet manager device can remain informed about the status of operation of various vehicles in a fleet and whether drivers are conforming to regulations.

To utilize the functionality of the route management system 106, users (e.g., fleet managers, drivers, or operators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, wearables, watches, glasses, tablets; smart televisions; set-top boxes; and/or any other network enabled computing devices. Hence, the client devices 104 may be of varying type, capabilities, operating systems, and so forth.

A user (e.g., driver or operator) interacts with a route management system 106 via a client-side application installed on the client device 104. In some examples, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) or GUI for the user to interact with the route management system 106. For example, the user interacts with the route management system 106 via a client-side application integrated with the file system or via a webpage displayed using a web browser application.

The UI of the client-side application can allow an end user to review one or more notifications representing targets detected in one or more images obtained from one or more cameras of a vehicle 102 using a machine learning model guided based on one or more prompts. In some examples, the UI can present a set of instructions for resolving the detected target or removing the detected target in the images and transmitting a status of the target detection to a fleet manager device.

As discussed earlier, the route management system 106 enables fleet managers to generate and track vehicle routes. For example, the route management system 106 may provide a UI that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, geographical locations of such stops or destinations, geofences associated with each stop or destination, scheduled amount of time to be spent at each stop before departing to a subsequent stop or destination, an order at which the vehicle 102 is to stop at each scheduled stop, a scheduled beginning and ending time of the route, a scheduled arrival and departure time at the scheduled stops, and the like.

In some examples, a vehicle 102 can be provided multiple routes each including a respective set of route variables. The multiple routes may include some of the same stops or destinations (e.g., stops or destinations may overlap between routes) or the multiple routes may include exclusively unique stops or destinations. A vehicle 102 may only traverse one route at a time. Namely, the vehicle 102 can drive along a selected route to each stop of the selected route and such stops are tracked for the selected route. Stops of other routes that have not been selected may not be tracked while the vehicle is navigating or driving along a selected route. For example, if two routes include a same particular stop or destination (e.g., include two stops with overlapping geofences), when the vehicle 102 reaches or crosses a geofence of the particular stop or destination associated with a first of the routes that is currently an active route (e.g., because the route was selected for navigation), the particular stop or destination is marked completed in association with the first of the routes but remains incomplete or scheduled in association with a second of the two routes.

The UI provided by the route management system 106 enables fleet managers to select the set of route variables to define a route. For example, the UI may provide a listing of geographic locations and times that a fleet manager may select from to define a route. A fleet manager may use the UI to select geographic locations to be included in the route, such as a beginning location, end location, geographical locations of such stops or destinations, geofences associated with each stop or destination, scheduled amount of time to be spent at each stop before departing to a subsequent stop or destination, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet manager to select which route is currently active and which are inactive for a particular vehicle 102. The UI may also provide notifications or alerts associated with an active route indicating stops along the route and/or whether a vehicle 102 is early or late with respect to the scheduled arrival/departure time of one or more stops.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the UI may enable an administrator to enter data identifying a vehicle 102 or vehicle operator, as well as enter a new vehicle 102 or vehicle operator.

The route management system 106 provides for automated tracking of the vehicles 102 based on the routes assigned by the fleet manager. For example, the route management system 106 receives sensor data describing the current location and/or motion of the vehicle 102 and/or including images or videos obtained from the vehicle 102, which the route management system 106 uses to track location of the vehicle 102 and to detect presence or existence of one or more targets in the images and/or videos. As referred to herein, the terms "stop," "destination," and "location" may be used interchangeably and may have the same meaning. The sensor data may be received from the vehicle 102 and/or from a client device 104 of the vehicle operator in real time or periodically.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include some or all of the information of the route including the route variables.

In some examples, the route tracking report can include historical, current and future route information. Namely, the route tracking report can include information that identifies a list of routes previously assigned and completed or partially completed by a driver. The route tracking report can include currently assigned routes that are actively being driven and/or completed. The route tracking report can include routes assigned in the future to be driven at a future date. Such routes can include updates or changes which are tracked and stored by the route tracking report. The route tracking report can include image modeling data for each vehicle 102 and/or driver that specifies the targets detected in the images, frequency of detecting the targets, and/or various other parameters of the vehicle 102 and/or driver.

The route management system 106 uses geofences to determine when vehicles 102 have arrived and/or departed from scheduled stops along a route. A geofence is a virtual perimeter for a real-world geographic area. Geofences are established to encompass each scheduled stop along a route. The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. In such cases, the route management system 106 may mark or set the corresponding stop to a completed state. Similarly, the route management system 106 may determine that the vehicle 102 has departed the scheduled stop if the current location of the vehicle 102 is subsequently outside of the geofence encompassing the scheduled stop for another threshold period of time. The stops along a route can be navigated to sequentially or in any arbitrary order. Regardless of the order in which the stops are navigated to, the route management system 106 automatically sets a given stop of a given route to a completed state in response to determining that the given route is in the active route state and that the current location of the vehicle is within the geofence associated with the given stop.

Figure 2:
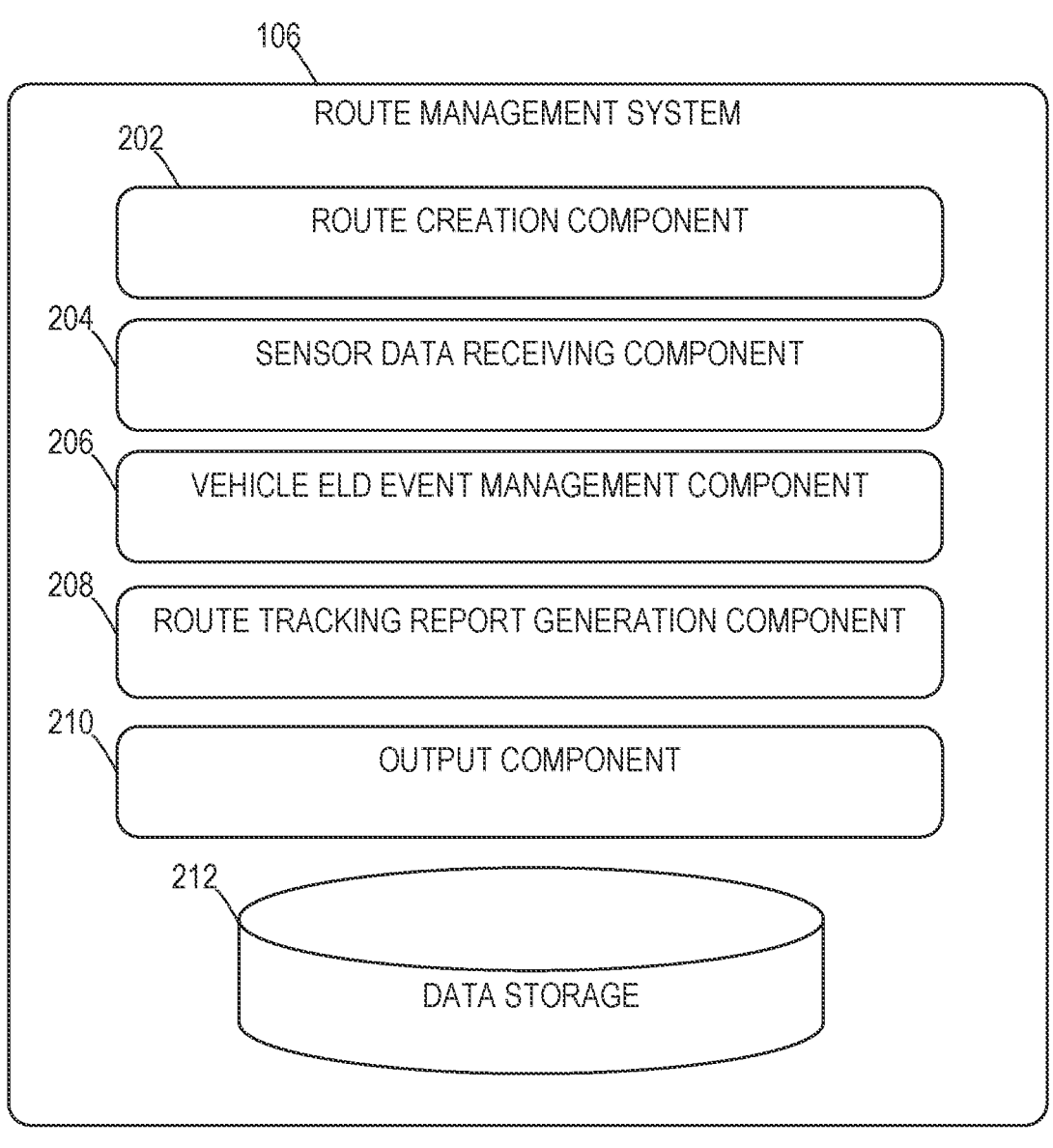
FIG. 2 is a block diagram of a route management system, according to some examples.

FIG. 2 is a block diagram of the route management system 106, according to some examples. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, a vehicle electronic logging device (ELD) event management component 206, a route tracking report generation component 208, an output component 210, and a data storage 212.

The route creation component 202 enables fleet managers to generate routes and assign routes to vehicles 102. For example, the route creation component 202 may provide a UI that allows fleet managers to generate vehicle routes. A vehicle route is a route to be traversed by a vehicle 102 that is defined by a set of route variables, discussed above. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like. The route variables may also include geographical locations of such stops or destinations, geofences associated with each stop or destination, and/or scheduled amount of time to be spent at each stop before departing to a subsequent stop or destination. The route variables may be stored as part of a route tracking report in data storage 212. The route creation component 202 can also allow fleet managers to designate or enable mixed-use settings for certain vehicles 102, drivers, and/or users.

The UI provided by the route creation component 202 enables fleet managers to select the set of route variables for a route. For example, the UI may provide a listing of geographic locations and times that a fleet manager may select from to define a route. A fleet manager may use the UI to select geographic locations to be included in the route, such as a beginning location, end location, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet managers to specify geographical locations of such stops or destinations, geofences associated with each stop or destination, and/or scheduled amount of time to be spent at each stop before departing to a subsequent stop or destination.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator. The UI may also enable the fleet managers to specify which of a set of routes assigned to a given vehicle 102 is currently active and being tracked. In some examples, the UI can be presented to a driver to enable the driver to manually select which routes are currently active and/or to switch from one route being in the active state to another route being in the active state from a scheduled state. Tracking a route includes determining whether stops along the route have been completed or are scheduled for arrival. Stops that are being tracked can be used to generate ETAs of the corresponding stops.

As referred to herein, routes that are in the active state have their associated stops tracked for completion, such that when a geofence of a given one of the stops is broken or reached by the current location of the vehicle, the stop is marked or set to a completed state. Routes that are in the inactive, completed, or scheduled state do not currently have their stops tracked. In such cases, when the geofence of such routes is broken or reached by the current location of the vehicle, the corresponding stop remains in the scheduled, completed, skipped, or inactive state. In some examples, only one route at a time can be in the active state. In some examples, multiple routes can be in the active state simultaneously.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 can include an ELD and/or communicate with an ELD of certain vehicles 102 to receive sensor data used to provide automated route tracking and detect targets in one or more images and/or videos. For example, the sensor data receiving component 204 receives sensor data describing the current location and/or motion of a vehicle 102 and/or images and/or videos from a camera of the vehicle 102. The sensor data may be received from the vehicle 102 and/or from a client device 104 of the vehicle operator that is operating the vehicle 102, such as one or more dashcams. The operations of the sensor data receiving component 204 are discussed in more detail below in connection with FIG. 3.

The route tracking report generation component 208 generates a route tracking report for access by the vehicle ELD event management component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include information on routes tracked in the past for a vehicle 102, routes currently assigned to the vehicle 102, and routes assigned to the vehicle to be driven in the future. In some examples, the route tracking report includes route information for up to 30 days in the past and 30 days in the future, although other suitable time periods can be used.

The vehicle ELD event management component 206 detects an event representing an improper operation of an ELD of a vehicle. The vehicle ELD event management component 206, in response to detecting the event, generates, for display, a notification representing the event to a driver of the vehicle and retrieves instructions for resolving the improper operation of the ELD. The vehicle ELD event management component 206 presents the instructions as part of the notification. The vehicle ELD event management component 206 coordinates communicating the event and a resolution status of the event to a fleet manager of the vehicle.

The output component 210 provides the route tracking report (e.g., the GUI including the messages and/or notifications generated by the sensor data receiving component 204 of a plurality of vehicles 102) to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 and to access the user interface provided by the output component 210.

The output component 210 may also transmit notifications based on the data included in a route tracking report. For example, the output component 210 may transmit a notification to a client device 104 of a vehicle operator indicating that the vehicle operator has missed a scheduled stop, is behind schedule, is not following the correct route, indications of targets detected in one or more images, and the like. Similarly, the output component 210 may transmit a notification to a client device 104 of a fleet manager or other user to provide status updates associated with a route, such as the vehicle 102 having started at a route, arriving at a scheduled stop, left a scheduled stop, missed a scheduled stop, completed the route, and the like.

Figure 3:
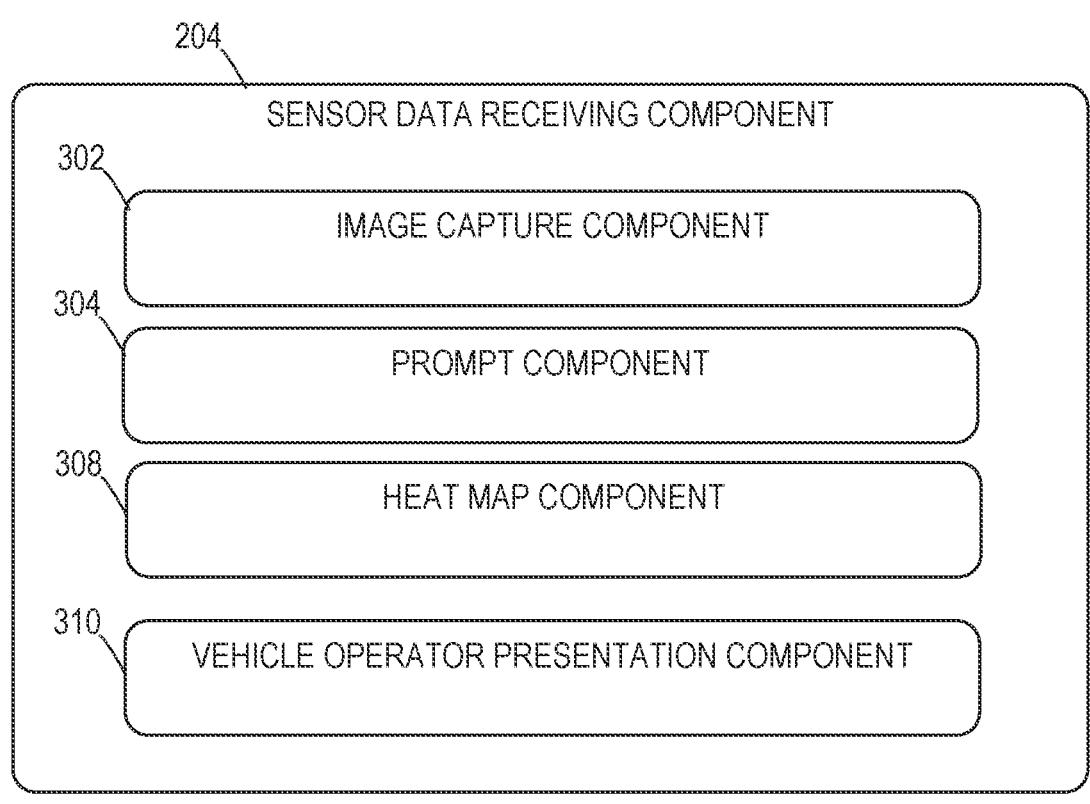
FIG. 3 is a block diagram of a sensor data receiving component, according to some examples.

As shown in FIG. 3, the sensor data receiving component 204 may include an image capture component 302, a prompt component 304, a heat map component 308, and a vehicle operator presentation component 310. A general operation of the sensor data receiving component 204 is first described followed by specific operation of these various components. The sensor data receiving component 204 can be implemented in whole or in part by each individual vehicle 102 and/or by one or more servers implementing the route management system 106 coupled to the vehicle 102.

In some examples, the sensor data receiving component 204 receives an image from a camera of a vehicle. The image can depict one or more objects. The sensor data receiving component 204 can receive a prompt defining a target to be detected in the image and analyzes the image and data associated with the prompt using a machine learning model to generate a prediction indicating whether the one or more objects depicted in the image match the target defined by the prompt. The sensor data receiving component 204 causes a message to be displayed to an operator representing the prediction. In some examples, the machine learning model includes at least one of a Contrastive Language-Image Pre-Training (CLIP) neural network model or a CLIP-segmentation (CLIPSeg) neural network model and/or any other artificial convolutional neural network.

In some examples, the prompt includes text describing the target. In some examples, the sensor data receiving component 204 generates an embedding representing the text. The data associated with the prompt can include the embedding. In some cases, the prompt includes a mask defining the target. In some examples, the sensor data receiving component 204 generates an embedding representing the mask. The data associated with the prompt can include the embedding.

In some examples, the sensor data receiving component 204 generates the embedding by receiving an annotated training image depicting a training object corresponding to the target and receiving a text-based prompt defining the target. The sensor data receiving component 204 analyzes the annotated training image and the text-based prompt using the machine learning model to perform operations including: translating the annotated training image into an image embedding; translating the text-based prompt into a text embedding; and estimating an output mask identifying a region of the annotated training image corresponding to the target using the image embedding and the text embedding.

In some examples, the sensor data receiving component 204 computes a loss function based on the estimated output mask and a ground truth mask and updates the text embedding to regenerate the output mask and recompute the loss function until a stopping criterion is satisfied. The mask can be generated based on the estimated output mask. In some cases, the loss function is computed based on solving an optimization problem.

In some examples, the sensor data receiving component 204 receives a second annotated training image depicting a training object that excludes the target and analyzes the second annotated training image and the text-based prompt. The sensor data receiving component 204 can use the machine learning model to perform operations including: translating the second training image into a second image embedding and estimating a second output mask identifying a region of the second annotated training image corresponding to the target using the second image embedding and the text embedding. In some examples, the sensor data receiving component 204 re-computes the loss function based on the second output mask and the ground truth mask and updates the text embedding to regenerate the second output mask and recompute the loss function until the stopping criterion is satisfied. The loss function can be computed based on solving the optimization problem.

In some examples, the prompt defining the target is different for different types of vehicles. In some cases, the sensor data receiving component 204 determines a type of vehicle associated with the camera and selects a prompt from a plurality of prompts based on the type of vehicle that is determined. The image and data associated with the prompt can be analyzed based on the selected prompt.

In some examples, the prediction generated by the machine learning model includes a mask that identifies a region of the image corresponding to the target. In some cases, the message includes a heat map representing pixels of the image that correspond to the target. In some examples, the message includes a bounding box representing pixels of the image that correspond to the target. In some cases, the data associated with the prompt includes a one-hot vector and/or floating point vector used as a task embedding for the machine learning model.

In some examples, the sensor data receiving component 204 generates a heat map based on the prediction. The sensor data receiving component 204 generates a bounding box based on the heat map. In some cases, the sensor data receiving component 204 compares a size of the bounding box to a threshold and conditions generation of the message based on whether the size of the bounding box transgresses the threshold.

Turning now to the individual components of the sensor data receiving component 204, the image capture component 302 can be installed in a vehicle 102 or associated with one or more vehicles 102. The image capture component 302 can receive data from an ELD of one or more vehicles. For example, the image capture component 302 can receive one or more real-time images or previously captured images from one or more cameras (e.g., dashcams) of the one or more vehicles 102. The image capture component 302 continuously or periodically receives data from the one or more vehicles.

The sensor data receiving component 204 can utilize the prompt component 304 to generate a prompt to guide a machine learning model, such as a CLIP model, to accurately detect one or more targets in the images and/or videos received from the image capture component 302. The prompt component 304 can access vehicle type information from the route management system 106. Based on the vehicle type information, the prompt component 304 can identify one or more prompts associated with the vehicle type. These prompts can be stored in a database and associated with each type of the various types of vehicles. The prompts can be stored as previously generated embeddings, textual strings indicative of targets to be detected, and/or images including masks that define the targets to be detected in the images. The prompt component 304 can provide the prompt to the heat map component 308 along with one or more images received from the image capture component 302.

The heat map component 308 can implement one or more previously trained machine learning models. In some examples, these machine learning models can be CLIP models, CLIPSeg models, and/or any other neural network model. The machine learning models can be configured to process or analyze images to detect one or more objects together with prompts that define targets to be identified. The machine learning models, once detecting objects in the images, can apply embeddings associated with the prompts to determine whether the objects match the targets defined by the prompts. Based on an output of the machine learning models that includes a prediction of whether the targets are identified in the images received from the image capture component 302, the heat map component 308 can generate a heat map and/or bounding box around the predicted target. The heat map can include pixels of a first color (e.g., red) indicating a very high likelihood of the target being present in that corresponding region of the image and can include pixels in a second color (e.g., black/white) indicating a very low likelihood of the target being present. The gradients of the pixels can vary in brightness and/or color to represent how likely the corresponding region in the image includes the target defined by the prompt.

In some examples, the heat map can be processed together with the image to generate a bounding box around the region of the image that is associated with pixel values or heat map values above a specified threshold. Namely, the heat map component 308 can search or identify pixel values in the heat map that correspond to a likelihood above a minimum threshold of the target being present. These pixel values that are identified can be used to find the corresponding region of the image received from the image capture component 302. A bounding box of a specified shape (e.g., circle, square, triangle, and so forth) can be generated to enclose that region of the image corresponding to the target being present with at least the minimum likelihood. The bounding box can be overlaid on the image received from the image capture component 302. The image overlaid with the bounding box can be provided to the vehicle operator presentation component 310. The vehicle operator presentation component 310 can present a message that includes the heat map generated by the heat map component 308 and/or the image overlaid with the bounding box. The message can include the prompt and/or indication of the target that has been detected and can indicate how to resolve or remove the target.

Figure 5:
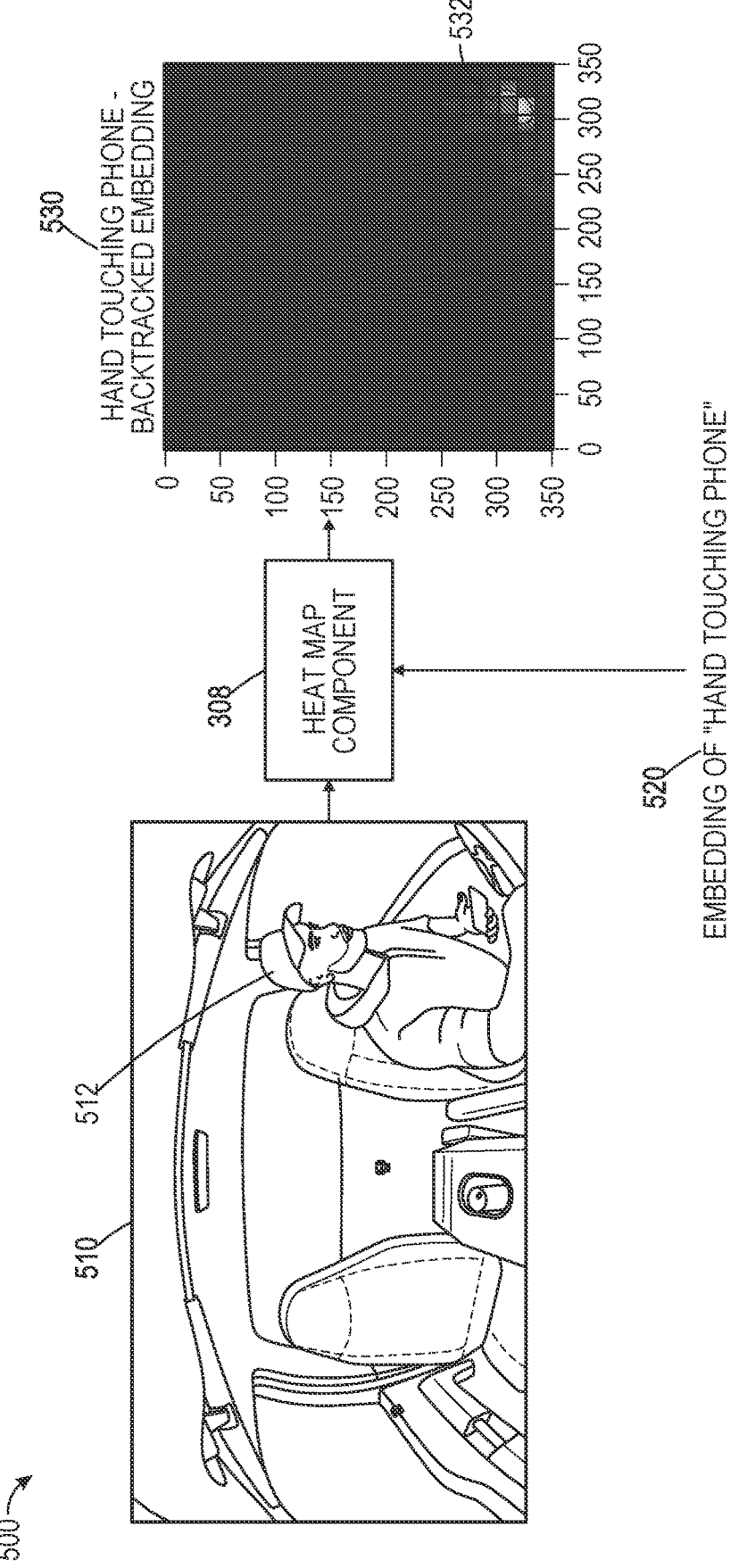
FIG. 5 provides example user interfaces for modeling images obtained from vehicles, according to some examples.

For example, as shown in the diagram 500 of FIG. 5, an image 510 can be received from the image capture component 302. The image 510 can depict an object 512 (e.g., a person holding a cell phone or other device/item). The prompt component 304 can search for and select an embedding associated with a vehicle type from which the image

510 has been received. The prompt component 304 can determine that the embedding 520 that is identified includes a target (e.g., the embedding indicates "hand touching phone"). This is the target to be detected or identified in the image and used to trigger presentation of a message. The image 510 and the embedding 520 can be provided to the heat map component 308. The heat map component 308 can process the image 510 together with the embedding 520 and generate the heat map 530. The heat map 530 can include a set of pixels 532 of different gradients/values indicating differing likelihoods of the target being present in the image 510. The heat map 530 can be used to generate a bounding box around the target in the image 510 (e.g., around the portion of the image where the object 512 is holding the item). In some cases, the heat map 530 can be presented to an operator, such as if the likelihood associated with a certain quantity of pixels transgresses a likelihood threshold.

Figure 6:
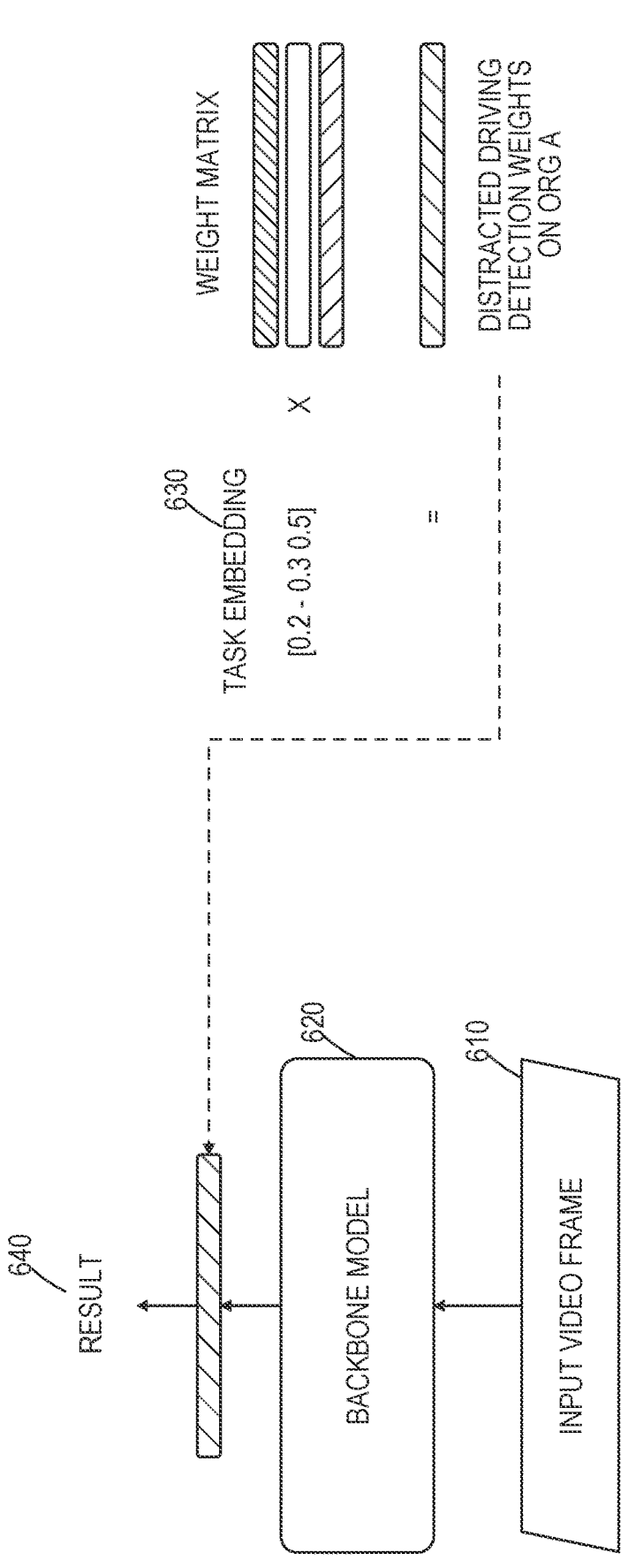
FIG. 6 is a block diagram of a heat map component, according to some examples.

In some examples, as shown in the diagram 600 of FIG. 6, the heat map component 308 can implement or include a backbone model 620. The backbone model 620 can implement a CLIP network (or other multiclass learning model (MTL model)) and can receive the image 510 as the input video frame 610. The backbone model 620 can generate an intermediate result that identifies various objects in the input video frame 610. The backbone model 620 can receive a vector 630 (e.g., floating point vector and/or one-hot vector) that represents the embedding 520. This vector 630 can be aggregated or multiplied with one or more layers (e.g., a middle layer and/or last layer) of the backbone model 620 to generate the result 640. The result 640 can correspond to the heat map 530.

In some examples, the prompt component 304 can be used in conjunction with the heat map component 308 to generate the embedding that is associated with a defined target. To do so, the prompt component 304 can receive a training textual prompt defining a target to be detected along with an image including a ground truth mask that corresponds to the target to be detected. For example, as shown in the diagram 700 of FIG. 7, the heat map component 308 can receive the annotated image 710 depicting a target 720 along with the ground truth mask 730 including a region 732 that defines the target to be detected. The prompt component 304 can access a first annotated training image (e.g., the annotated image 710) that depicts the target to be detected and/or a second annotated image that excludes a depiction of the target to be detected.

The prompt component 304 can provide the first annotated training image along with the training textual prompt to the heat map component 308. The heat map component 308 can generate a prediction of the heat map corresponding to the target defined by the prompt. The heat map component 308 can also output an embedding that has been derived based on the training textual prompt and which was used to generate the predicted heat map. For example, the heat map component 308 can include a CLIP-based segmentation model that takes as input an image and text and outputs a segmentation mask. The CLIP-based segmentation model can translate the image into an image embedding (Ei) and the text into a textual embedding (Et). The CLIP-based segmentation model can use the image embedding and the textual embedding to generate an estimated mask M, such as in accordance with M=f(Ei, Et). This embedding can be used to solve an optimization problem or loss function given the ground truth mask and the image embedding Ei, such as the loss defined as $\text{argmin}_{Et}L(f(Ei, Et), M)$. Namely, the heat map component 308 can try to adjust the text embedding Et such that the CLIP-based segmentation model outputs the mask M for a given training image and its image embedding Ei that matches the ground truth mask.

The heat map component 308 can compare the predicted heat map with the ground truth mask to compute a loss representing a deviation between the predicted heat map and the ground truth mask. Based on the computed deviation, the heat map component 308 can update the embedding to improve the heat map and reduce the loss. In some cases, the heat map component 308 can solve an optimization problem corresponding to the loss to generate the embedding that represents a minimal amount of loss between the predicted heat map and the ground truth mask. Once a stopping criterion is reached, the heat map component 308 can output the embedding. At this point, the embedding can be associated with the text and the vehicle type by the prompt component 304.

In some examples, the heat map component 308 can perform similar operations on the second annotated image to further refine the embedding. To do so, the heat map component 308 can access the second annotated training image (that excludes a depiction of the target) along with the training textual prompt. The heat map component 308 can generate a second prediction of the heat map corresponding to the target defined by the prompt, such as using the previously established embedding. The heat map component 308 can also output an updated embedding that has been derived based on the training textual prompt and/or previously established embedding and which was used to generate the predicted heat map. The heat map component 308 can compare the second predicted heat map with the ground truth mask to compute a loss representing a deviation between the second predicted heat map and the ground truth mask. Based on the computed deviation, the heat map component 308 can update the updated embedding again to improve the heat map and reduce the loss. In some cases, the heat map component 308 can solve an optimization problem corresponding to the loss to generate the updated embedding that represents a minimal amount of loss between the predicted heat map and the ground truth mask. Once a stopping criterion is reached, the heat map component 308 can output the updated embedding. At this point, the updated embedding can be associated with the text and the vehicle type by the prompt component 304.

FIG. 4 is a flowchart showing a process 400 for modeling images received from a vehicle, according to some examples. The process 400 may be embodied in computer-readable instructions for execution by one or more processors such that the operations of the process 400 may be performed in part or in whole by the route management system 106 (or any component thereof, such as the sensor data receiving component 204); accordingly, the process 400 is described below by way of example with reference thereto. However, it shall be appreciated that at least some of the operations of the process 400 may be deployed on various other hardware configurations and the process 400 is not intended to be limited to the route management system 106.

At operation 410, the route management system 106 receives an image from a camera of a vehicle, the image depicting one or more objects, as discussed above.

At operation 420, the route management system 106 receives a prompt defining target to be detected in the image, as discussed above.

At operation 430, the route management system 106 analyzes the image and data associated with the prompt using a machine learning model to generate a prediction indicating whether the one or more objects depicted in the image match the target defined by the prompt, as discussed above.

At operation 440, the route management system 106 causes a message to be displayed to an operator representing the prediction, as discussed above.

Software Architecture

Figure 8:
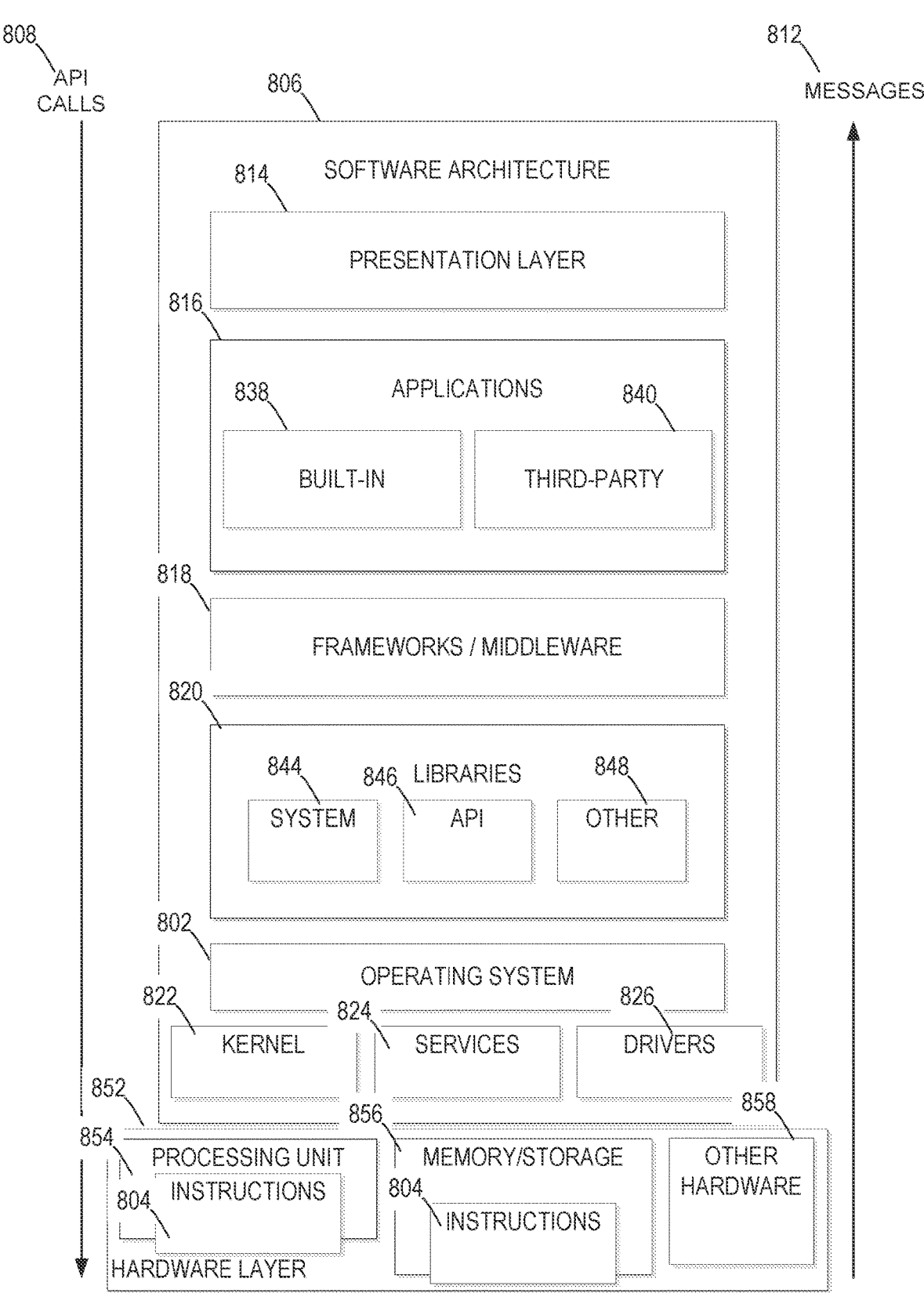
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
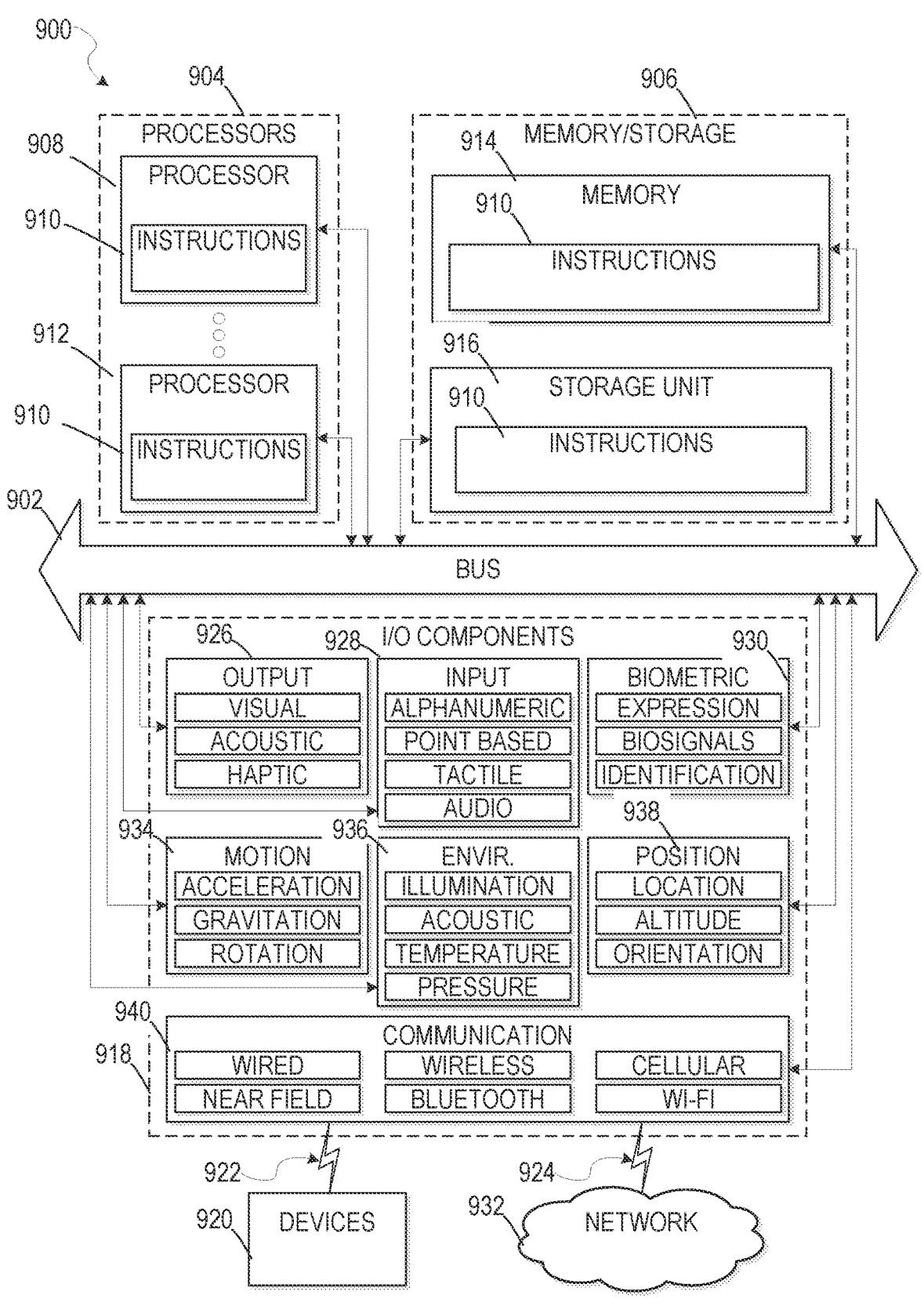
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

What is claimed is:

1. A method comprising:
receiving, by one or more processors, an image from a camera of a vehicle, the camera recording activity performed by a person inside of the vehicle, the image depicting one or more objects;
receiving a prompt defining a target to be detected in the image;
generating a textual embedding based on the prompt;
analyzing the image and the textual embedding using a machine learning model that comprises a backbone model, to generate a prediction that indicates whether the one or more objects depicted in the image match the target defined by the prompt, wherein the textual embedding is aggregated with one or more layers of the backbone model to generate the prediction;
overlaying a bounding box on the image received from the camera of the vehicle, the bounding box enclosing a region of the image that corresponds with the one or more objects; and
presenting, at a client device associated with the vehicle, a message comprising the image that includes the bounding box that encloses the region of the image along with a set of instructions generated based on a type of the target defined by the prompt.

2. The method of claim 1, wherein the machine learning model comprises at least one of a Contrastive Language-Image Pre-Training (CLIP) neural network model or a CLIP-segmentation (CLIPSeg) neural network model, wherein the CLIP-segmentation model performs operations comprising:
translating images into image embeddings; and
generating segmentation masks using the image embeddings and the textual embeddings in accordance with M=f(Ei, Et), where M represents an estimated mask, Ei represents an image embedding, and Et represents the textual embedding.

3. The method of claim 1, wherein the prompt comprises text describing the target, the target described by the text corresponding to an operator of the vehicle holding an object in one hand while driving the vehicle, the message comprising a notification instructing the operator of the vehicle to stop holding the object in one hand while driving the vehicle.

4. The method of claim 3, further comprising:
solving an optimization problem corresponding to a loss function defined as argminE L(f(Ei, Et), M) to generate an embedding that represents a minimal amount of loss between a predicted heat map and a ground truth mask, where the optimization adjusts the text embedding until a stopping criterion is satisfied.

5. The method of claim 1, wherein the prompt comprises a mask defining the target, the message indicating that the target defined by the prompt has been detected and information on how to resolve the target.

6. The method of claim 5, further comprising:

generating an embedding representing the mask, wherein the data associated with the prompt comprises the embedding.

7. The method of claim 6, wherein generating the embedding comprises:

receiving an annotated training image depicting a training object corresponding to the target;

receiving a text-based prompt defining the target; and analyzing the annotated training image and the text-based prompt using the machine learning model to perform operations comprising:

translating the annotated training image into an image embedding;

translating the text-based prompt into a text embedding; and estimating an output mask identifying a region of the annotated training image corresponding to the target using the image embedding and the text embedding.

8. The method of claim 7, further comprising:

computing a loss function based on the estimated output mask and a ground truth mask; and updating the text embedding to regenerate the output mask and recompute the loss function until a stopping criterion is satisfied, the mask being generated corresponding to the estimated output mask.

9. The method of claim 8, further comprising:

receiving a second annotated training image depicting a training object that excludes the target; and analyzing the second annotated training image and the text-based prompt using the machine learning model to perform operations comprising:

translating the second annotated training image into a second image embedding; and estimating a second output mask identifying a region of the second annotated training image corresponding to the target using the second image embedding and the text embedding.

10. The method of claim 9, further comprising:

re-computing the loss function based on the second output mask and the ground truth mask; and updating the text embedding to regenerate the second output mask and recompute the loss function until the stopping criterion is satisfied, the loss function being computed based on solving an optimization problem.

11. The method of claim 1, wherein the prompt defining the target is different for different types of vehicles.

12. The method of claim 11, further comprising:

determining a type of vehicle associated with the camera; and selecting a prompt from a plurality of prompts based on the type of vehicle that is determined, the image and data associated with the prompt being analyzed based on the selected prompt.

13. The method of claim 1, wherein the prediction generated by the machine learning model comprises a mask that identifies a region of the image corresponding to the target, further comprising:

processing the image to generate a heat map that includes pixels of different gradients indicating differing likelihoods of the target being present in the image; and processing the heat map to generate the bounding box around the target, the heat map being presented to an operator in response to determining that a certain quantity of pixels transgresses a likelihood threshold.

14. The method of claim 1, wherein the message comprises a heat map representing pixels of the image that correspond to the target, the heat map being presented to an operator of the vehicle, the heat map including pixels of different gradients indicating differing likelihoods of the target being present in the image, the heat map indicating pixel values that correspond to a likelihood above a minimum threshold of the target being present.

15. The method of claim 14, wherein the message comprises the bounding box representing pixels of the image that correspond to the target, the image being processed together with the heat map to generate the bounding box around the region of the image that is associated with the pixel values above the minimum threshold.

16. The method of claim 1, wherein the data associated with the prompt comprises a one-hot vector or floating point vector used as a task embedding for the machine learning model.

17. The method of claim 1, further comprising:

generating a heat map based on the prediction; and generating a bounding box based on the heat map.

18. The method of claim 17, further comprising:

comparing a size of the bounding box to a threshold; and conditioning generation of the message based on whether the size of the bounding box transgresses the threshold.

19. A vehicle system comprising:

one or more computer processors; and one or more non-transitory computer-readable mediums storing instructions that, when executed by the one or more computer processors, cause the vehicle system to perform operations comprising:

receiving an image from a camera of a vehicle, the camera recording activity performed by a person inside of the vehicle, the image depicting one or more objects;

receiving a prompt defining a target to be detected in the image;

generating a textual embedding based on the prompt;

analyzing the image and the textual embedding using a machine learning model that comprises a backbone model, to generate a prediction that indicates whether the one or more objects depicted in the image match the target defined by the prompt, wherein the textual embedding is aggregated with one or more layers of the backbone model to generate the prediction;

overlaying a bounding box on the image received from the camera of the vehicle, the bounding box enclosing a region of the image that corresponds with the one or more objects; and presenting, at a client device associated with the vehicle, a message comprising the image that includes the bounding box that encloses the region of the image along with a set of instructions generated based on a type of the target defined by the prompt.

20. A non-transitory computer-readable medium storing instructions that, when executed by one or more computer processors of a vehicle system, cause the vehicle system to perform operations comprising:

receiving an image from a camera of a vehicle, the camera recording activity performed by a person inside of the vehicle, the image depicting one or more objects;

receiving a prompt defining a target to be detected in the image;

generating a textual embedding based on the prompt;

analyzing the image and the textual embedding using a machine learning model that comprises a backbone model, to generate a prediction that indicates whether the one or more objects depicted in the image match the target defined by the prompt, wherein the textual embedding is aggregated with one or more layers of the backbone model to generate the prediction;

overlaying a bounding box on the image received from the camera of the vehicle, the bounding box enclosing a region of the image that corresponds with the one or more objects; and presenting, at a client device associated with the vehicle, a message comprising the image that includes the bounding box that encloses the region of the image along with a set of instructions generated based on a type of the target defined by the prompt.

\* \* \* \* \*